(12) United States Patent
Chen

(10) Patent No.: US 9,152,275 B2
(45) Date of Patent: Oct. 6, 2015

(54) OPTICAL TOUCH SYSTEM, METHOD OF TOUCH DETECTION AND NON-TRANSITORY COMPUTER READABLE MEDIUM RECORDING PROGRAM INSTRUCTIONS

(71) Applicant: Wistron Corporation, New Taipei (TW)

(72) Inventor: Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 44 days.

(21) Appl. No.: 14/109,930

(22) Filed: Dec. 17, 2013

(65) Prior Publication Data

US 2014/0204061 A1 Jul. 24, 2014

(30) Foreign Application Priority Data

Jan. 18, 2013 (TW) .............................. 102102067 A

(51) Int. Cl.
*G06F 3/042* (2006.01)

(52) U.S. Cl.
CPC ............ *G06F 3/0421* (2013.01); *G06F 3/0428* (2013.01)

(58) Field of Classification Search
CPC ................ G06F 3/0421; G06F 3/0428; G06F 2203/04108; G06F 2203/04101
See application file for complete search history.

(56) References Cited

U.S. PATENT DOCUMENTS

| 2003/0006973 A1* | 1/2003 | Omura et al. ................. 345/175 |
| 2009/0189878 A1* | 7/2009 | Goertz et al. ................. 345/175 |
| 2011/0084937 A1 | 4/2011 | Chang et al. |
| 2012/0075246 A1 | 3/2012 | Chang et al. |
| 2012/0075250 A1 | 3/2012 | Chang et al. |

FOREIGN PATENT DOCUMENTS

TW 201122966 7/2011

OTHER PUBLICATIONS

"Office Action of Taiwan Counterpart Application" with partial English translation, issued on Jan. 20, 2015, p. 1-p. 16.

* cited by examiner

*Primary Examiner* — Liliana Cerullo
(74) *Attorney, Agent, or Firm* — Jianq Chyun IP Office

(57) ABSTRACT

An optical touch system includes a light source module, at least one image detecting module and a processing unit. The light source module provides a detecting light. The detecting light is transmitted in front of the base plane. The image detecting module detects an intensity variation of the detecting light. The image detecting module generates a detecting signal corresponding to the detecting light. When an object approaches or touches the base plane, at least a portion of the detecting light is obstructed by the object. The processing unit determines a position of the object with respect to the base plane according to the detecting signal, and determines that the object approaches or touches the base plane according to an intensity of a portion of the detecting signal corresponding to an obstruction position of the object. A method of touch detection and a computer program product are also provided.

24 Claims, 6 Drawing Sheets

OPTICAL TOUCH SYSTEM, METHOD OF TOUCH DETECTION AND NON-TRANSITORY COMPUTER READABLE MEDIUM RECORDING PROGRAM INSTRUCTIONS

CROSS-REFERENCE TO RELATED APPLICATION

This application claims the priority benefit of Taiwan application serial no. 102102067, filed on Jan. 18, 2013. The entirety of the above-mentioned patent application is hereby incorporated by reference herein and made a part of this specification.

BACKGROUND OF THE DISCLOSURE

1. Field of the Disclosure

The disclosure relates to a touch system, and more particularly, to an optical touch system.

The disclosure relates to a method of detection, and more particularly, to a method of touch detection.

The disclosure relates to a computer program product, and more particularly, to a computer program product for determining an action of an object approaching or touching a base plane.

2. Description of Related Art

In recent years, touch electronic products are favored by consumers due to convenience operation and high intuitiveness, and have gradually become the mainstream in the market. In the resistive, capacitive and rear projection touch screens that are conventionally used in the electronic products, the capacitive touch screen has the best touch-sensing performance, however, the manufacturing cost of the capacitive touch screen is the highest among the different touch screens. Furthermore, the applications for the capacitive touch screen are limited with the increase of the size of the touch screen. Moreover, along with the number of functions increasing in the electronic products, the touch operating method is no longer satisfying the demands from users on operating. Therefore, floating touch sensing electronic products have been further developed in recent years, so as to enhance the convenience and intuitiveness on operating for users.

Currently, a majority of floating touch sensing devices in the market employ a difference in capacitance effects which is generated by an object (such as a stylus pen) or finger being floated or touched the sensing device, to determine whether the object/finger is floated above the sensing device or is touched the sensing device, thereby providing different functions. However, when the object is slightly distant from the sensing device, the capacitive floating touch sensing device is prone to determine as no object due to the rapid declined in capacitance, and thus an error in detection or insensitivity is prone to occur during an operation. In comparison with the method such as using the finger to click in the air or the direct contact, that the user is required to utilize the specialized stylus pen in order to achieve the touch effect is less intuitive, although the use of the specialized stylus pen is capable of reducing the afore-described phenomenon. Hence, how to provide a floating touch device with high intuition and sensitivity has become one of the current issues to be addressed for people having ordinary skill in the pertinent field.

SUMMARY OF THE DISCLOSURE

The disclosure is directed to an optical touch system which determines an action of an object approaching or touching a base plane.

The disclosure is directed to a method of touch detection which determines an action of an object approaching or touching a base plane.

The disclosure is directed to a computer program product which determines an action of an object approaching or touching a base plane.

An embodiment of the disclosure provides an optical touch system configured to determine an action of an object approaching or touching a base plane. The optical touch system includes a light source module, at least one image detecting module and a processing unit. The light source module is disposed beside the base plane, and provides a detecting light in which the detecting light is transmitted in front of the base plane. The image detecting module is disposed beside the base plane, and detects an intensity variation of the detecting light. The image detecting module generates a detecting signal corresponding to the detecting light, and at least a portion of the detecting light is obstructed by the object when the object approaches or touches the base plane. The processing unit determines a position of the object with respect to the base plane according to the detecting signal, and determines that the object approaches or touches the base plane according to an intensity of a portion of the detecting signal corresponding to an obstruction position of the object.

In an embodiment of the disclosure, the light source module includes a reflecting unit and at least one light emitting module. The reflecting unit is disposed beside the base plane. The light emitting module is disposed beside the base plane. The detecting light emitted from the light emitting module is transmitted to the reflecting unit through a front of the base plane, and the image detecting module detects the detecting light reflected by the reflecting unit to generate the detecting signal.

In an embodiment of the disclosure, if the detecting signal conforms with a predetermined touch condition, then the processing unit determines that the object touching the base plane, and if the detecting signal conforms with a predetermined float condition, then the processing unit determines that the object approaching and floating above the base plane.

In an embodiment of the disclosure, the predetermined touch condition is that a signal intensity of the detecting signal is lower than a predetermined touch value, and the predetermined float condition is that a signal intensity of the detecting signal is higher than the predetermined touch value and lower than a predetermined float value.

In an embodiment of the disclosure, when the object is distant from the base plane, the image detecting module generates a background signal corresponding to the detecting light and the processing unit calculates the predetermined touch value and the predetermined float value according to the background signal.

In an embodiment of the disclosure, the predetermined touch value is M times the background signal, and the predetermined float value is N times the background signal, where N>M.

In an embodiment of the disclosure, the ranges of M and N are $2/10<M<3/10$ and $7/10<N<8/10$.

In an embodiment of the disclosure, the at least one light emitting module is a plurality of light emitting modules, the at least one image detecting module is a plurality of image detecting modules, each of the light emitting modules correspondingly forms an optical module with one of the image detecting modules, the processing unit employs a triangulation method for processing the detecting signals from the optical modules to determine a two-dimensional coordinate of the object with respect to the base plane.

In an embodiment of the disclosure, the at least one image detecting module is a plurality of image detecting modules, and the optical touch system determines a two-dimensional coordinate of the object with respect to the base plane via a triangulation method according to each of the detecting signals respectively detected by each of the image detecting modules.

In an embodiment of the disclosure, the optical touch system further includes a display apparatus, in which a display surface of the display apparatus is the base plane.

An embodiment of the disclosure provides a method of touch detection configured to determine an action of an object approaching or touching a base plane. The method of touch detection includes: providing at least one detecting light and causing the detecting light to be transmitted though a front of the base plane; detecting the detecting light and generating a detecting signal corresponding to the detecting light, in which when the object approaches or touches the base plane, at least a portion of the detecting light is obstructed by the object; and determining a position of the object with respect to the base plane according to the detecting signal, and determining that the object approaches or touches the base plane according to an intensity of a portion of the detecting signal corresponding to an obstruction position of the object.

In an embodiment of the disclosure, the detecting light is provided by at least one light emitting module disposed beside the base plane, the detecting light is transmitted to a reflecting unit disposed beside the base plane through the front of the base plane, and the detecting light reflected by the reflecting unit is detected to generate the detecting signal.

In an embodiment of the disclosure, the step of determining that the object approaches or touches the base plane according to the intensity of the portion of the detecting signal corresponding to the obstruction position of the object includes: determining whether the detecting signal conforms with a predetermined touch condition, in which if the detecting signal conforms with the predetermined touch condition, the object is determined to be touching the base plane; and determining whether the detecting signal conforms with a predetermined float condition, in which if the detecting signal conforms with the predetermined float condition, the object is determined to be approaching and floating above the base plane.

In an embodiment of the disclosure, the predetermined touch condition is that a signal intensity of the detecting signal is lower than a predetermined touch value, and the predetermined float condition is that a signal intensity of the detecting signal is higher than the predetermined touch value and lower than a predetermined float value.

In an embodiment of the disclosure, the method of touch detection further includes: generating a background signal when the object is distant from the base plane, and calculating the predetermined touch value and the predetermined float value according to the background signal.

In an embodiment of the disclosure, the at least one detecting light is a plurality of detecting lights, and the method of touch detection further includes: employing a triangulation method for processing the detecting signals respectively corresponding to the detecting lights to determine a two-dimensional coordinate of the object with respect to the base plane.

An embodiment of the disclosure provides a computer program product in a computer readable medium for determining an action of an object approaching or touching a base plane. The computer program product includes:

first instructions for providing at least one detecting light and causing the detecting light to be transmitted though a front of the base plane;

second instructions for detecting the detecting light and generating a detecting signal corresponding to the detecting light, in which when the object approaches or touches the base plane, at least a portion of the detecting light is obstructed by the object; and third instructions for determining a position of the object with respect to the base plane according to the detecting signal, and determining that the object approaches or touches the base plane according to an intensity of a portion of the detecting signal corresponding to an obstruction position of the object.

In an embodiment of the disclosure, the third instructions include instructions for determining whether the detecting signal conforms with a predetermined touch condition, in which if the detecting signal conforms with the predetermined touch condition, the object is determined to be touching the base plane, and instructions for determining whether the detecting signal conforms with a predetermined float condition, in which if the detecting signal conforms with the predetermined float condition, the object is determined to be approaching and floating above the base plane.

In an embodiment of the disclosure, the computer program product further includes instructions for generating a background signal when the object is distant from the base plane and calculating the predetermined touch value and the predetermined float value according to the background signal.

In an embodiment of the disclosure, the at least one detecting light is a plurality of detecting lights, and the computer program product further includes instructions for employing a triangulation method for processing the detecting signals respectively corresponding to the detecting lights to determine a two-dimensional coordinate of the object with respect to the base plane.

Based on the above description, the optical touch system, the method of touch detection and the computer program product in the embodiments of the disclosure are capable of determining that the object approaches or touches the base plane through the intensity of the portion of the detecting signal corresponding to an obstruction position of the object.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
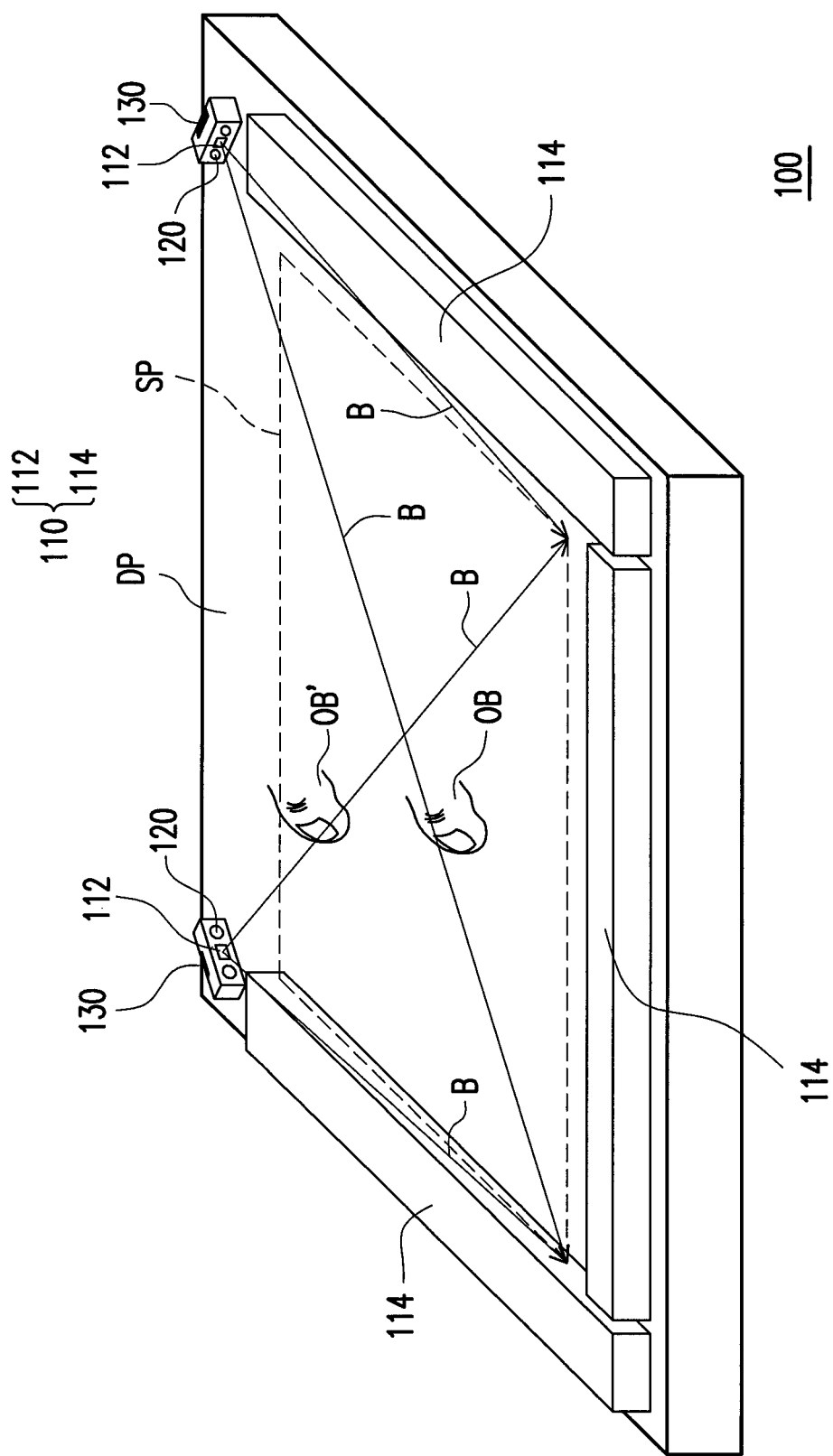
FIG. 1A is a schematic diagram showing an optical touch system according to an embodiment of the disclosure.
Figure 1B:
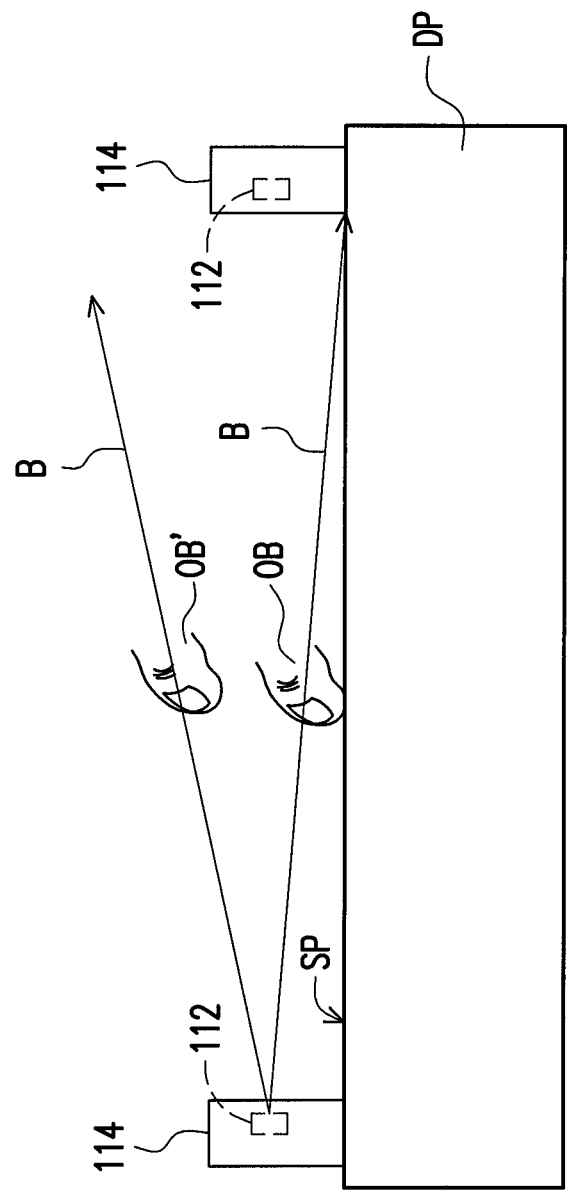
FIG. 1B is a side-view schematic diagram showing an optical touch system according to the embodiment shown in FIG. 1A.

FIG. 1A is a schematic diagram showing an optical touch system according to an embodiment of the disclosure, and FIG. 1B is a side-view schematic diagram showing an optical touch system according to the embodiment shown in FIG. 1A. Referring to FIG. 1A and FIG. 1B together, in the embodiment, the optical touch system 100 can be configured to determine an action of an object OB (such as the finger depicted in FIG. 1A and FIG. 1B, alternatively, can also be other objects capable of obstructing lights) approaching or touching a base plane SP, in which the base plane SP can be a display surface of a display apparatus depicted in FIG. 1A, although the disclosure is not limited thereto. The optical touch system 100 includes a light source module 110, at least one image detecting module 120 and a processing unit 130. The light source module 110 is disposed beside the base plane SP, and provides a detecting light B. The detecting light B is transmitted in front of the base plane SP. The image detecting module 120 is disposed beside the base plane SP, and detects an intensity variation of the detecting light B. The image detecting module 120 generates a detecting signal DS (which is illustrated in the following FIG. 2) corresponding to the detecting light B. In the embodiment, the light source module 110 includes a reflecting unit 114 and at least one light emitting module 112, in which three arranged reflecting units 114 and two light emitting modules 112 depicted in FIG. 1A are taken as an example, although the disclosure is not limited thereto. The reflecting units 114 are disposed beside the base plane SP, and the light emitting modules 112 are disposed beside the base plane SP, in which the detecting light B emitted from the light emitting module 112 is transmitted to the reflecting unit 114 through a front of the base plane SP. The image detecting module 130 detects the detecting light B reflected by the reflecting unit 114 to generate a detecting signal DS. Alternatively, in other embodiments, the light source module 110 can be other light sources formed by non-reflective devices which can also achieve the similar effect as in the embodiment, although the disclosure is not limited thereto.

When the object OB approaches or touches the base plane SP, at least a portion of the detecting light B is obstructed by the object OB. The processing unit 130 determines the position of the object OB with respect to the base plane SP according to the detecting signal DS, and determines that the object approaches or touches the base plane SP according to an intensity of a portion of the detecting signal DS corresponding to the obstruction position of the object OB. In other words, the optical touch system 100 in the embodiment can determine whether the object OB currently touches the base plane SP (i.e., the position of the object OB depicted in FIG. 1A and FIG. 1B) or floats above the base plane SP (i.e., the position of the object OB' depicted in FIG. 1A and FIG. 1B) through the detecting signal DS detected by the image detecting module 130, such that the effect of floating touch detection can be achieved without using specific objects such as the stylus pen. In the embodiment, the processing unit 130 can be a hardware (such as a digital logic circuit), for instance. However, in other embodiments, the processing unit 130 can also be represented in the form of firmware or software, although the disclosure is not limited thereto.

Figure 2A:
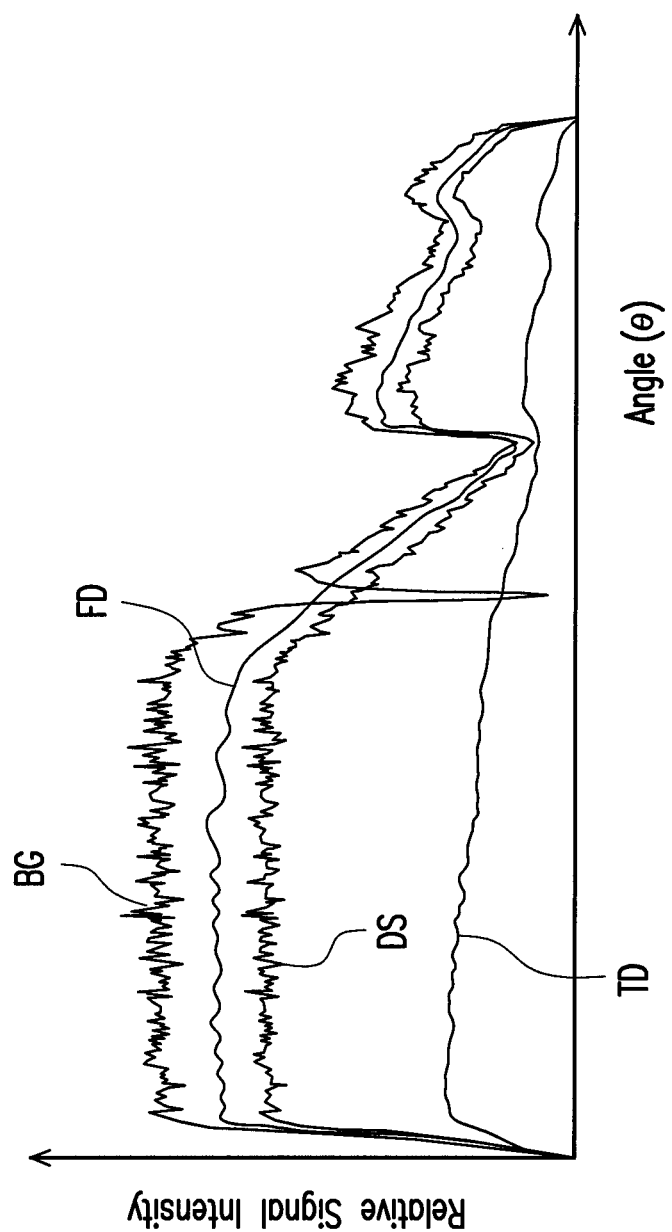
FIG. 2A is a signal waveform diagram showing signals detected by an optical touch system when an object touches a base plane according to the embodiment shown in FIG. 1A.
Figure 2B:
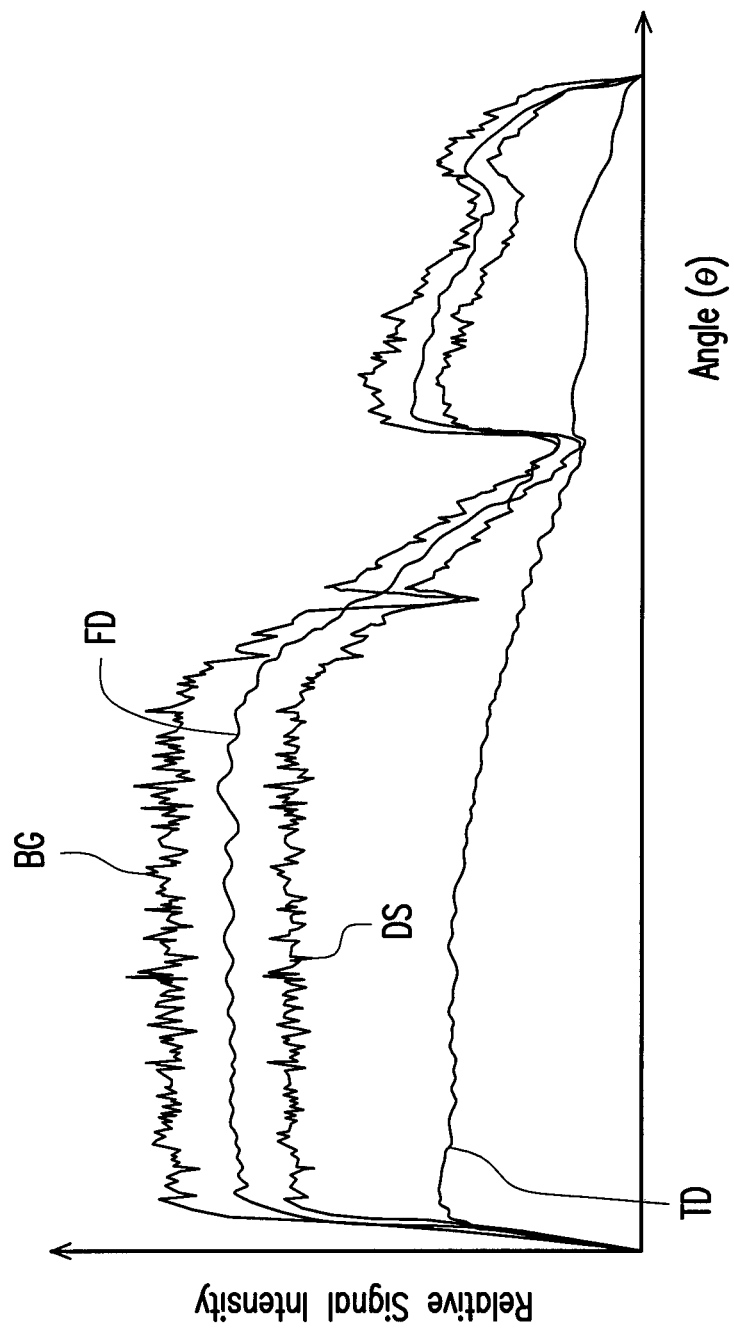
FIG. 2B is a signal waveform diagram showing signals detected by an optical touch system when an object floats above a base plane according to the embodiment shown in FIG. 1A.

FIG. 2A is a signal waveform diagram showing signals detected by an optical touch system when an object touches a base plane according to the embodiment shown in FIG. 1A, and FIG. 2B is a signal waveform diagram showing signals detected by an optical touch system when an object floats above a base plane according to the embodiment shown in FIG. 1A. Referring to FIG. 1A, FIG. 2A and FIG. 2B together, specifically, in the embodiment, when the object OB approaches the base plane SP, the signal intensity of the detecting signal DS normally decreases since the detecting light B is obstructed by the object OB which causes the intensity of the image detecting module 120 to decrease, in which if the detecting signal DS conforms with a predetermined touch condition, then the processing unit 130 determines that the object OB touches the base plane SP, and if the detecting signal DS conforms with a predetermined float condition, then the processing unit 130 determines that the object OB approaches and floats above the base plane SP.

To be more specific, in the embodiment, the predetermined touch condition is that the signal intensity of the detecting signal DS is lower than a predetermined touch value TD, for instance. In other words, when the signal intensity of the detecting signal DS is decreased because of being obstructed by the object OB, after reaching to lower than a predetermined touch value TD (i.e., the signal waveform of the predetermined touch value TD depicted in FIG. 2A), the processing unit 130 determines that the object OB is currently touching the base plane SP (such as the display surface of the display apparatus DP depicted in FIG. 1A). Moreover, the predetermined float condition is that the signal intensity of the detecting signal DS is higher than the predetermined touch value TD and lower than a predetermined float value FD, for instance. In other words, when the detecting signal DS is higher than the predetermined touch value TD but still lower than the predetermined float value FD (i.e., the signal waveform of the predetermined float value FD depicted in FIG. 2B), the processing unit 130 determines that the object OB is currently floating above the base plane SP. Accordingly, the optical touch system 100 is capable of detecting whether the object OB currently floats above the base plane SP or touches the base plane SP, thereby enhancing the convenience and intuitiveness on operating for users.

For example, the user can directly use the finger (regarded as the object OB) floating above the display surface of the display apparatus DP, so that the processing unit 130 can determine that the user's finger is not touched the display surface yet but with the intention to click (that is, the floating action) at this moment, thereby transmitting such signal to the display apparatus DP to generate such as a highlight state or a dotted frame for a selected region corresponding to the finger's position with respect to the display surface. When the user's finger touches the base plane SP, the processing unit 130 can also detect the afore-described signal and transmit to the display apparatus DP, so that the display surface generates such as a display frame showing a pressing-down result for confirmation. Accordingly, the user can use the touch function more intuitively, and concurrently, the convenience and enjoyment of the usage can also be enhanced.

Additionally, in FIG. 2A and FIG. 2B, when an object is distant from the base plane, the image detecting module 120 generates a background signal BG and the processing unit 130 calculates the predetermined touch value TD and the predetermined float value FD according to the background signal BG. To be specific, in the embodiment, the predetermined touch value TD can be M times the background signal BG, and the predetermined float value FD can be N times the background signal BG, where N>M. To be more specific, the ranges of M and N are 2/10<M<3/10 and 7/10<N<8/10. Accordingly, the optical touch system 100 is also capable of setting suitable M and N values according to the actual application condition, so as to enhance the sensitivity on the operation, thereby the operation being more convenient. However, in other embodiments, the predetermined touch value TD and the predetermined float value FD can also be calibrated in advance and stored in the processing unit 130 as the predetermined values, although the disclosure is not limited thereto.

Figure 3:
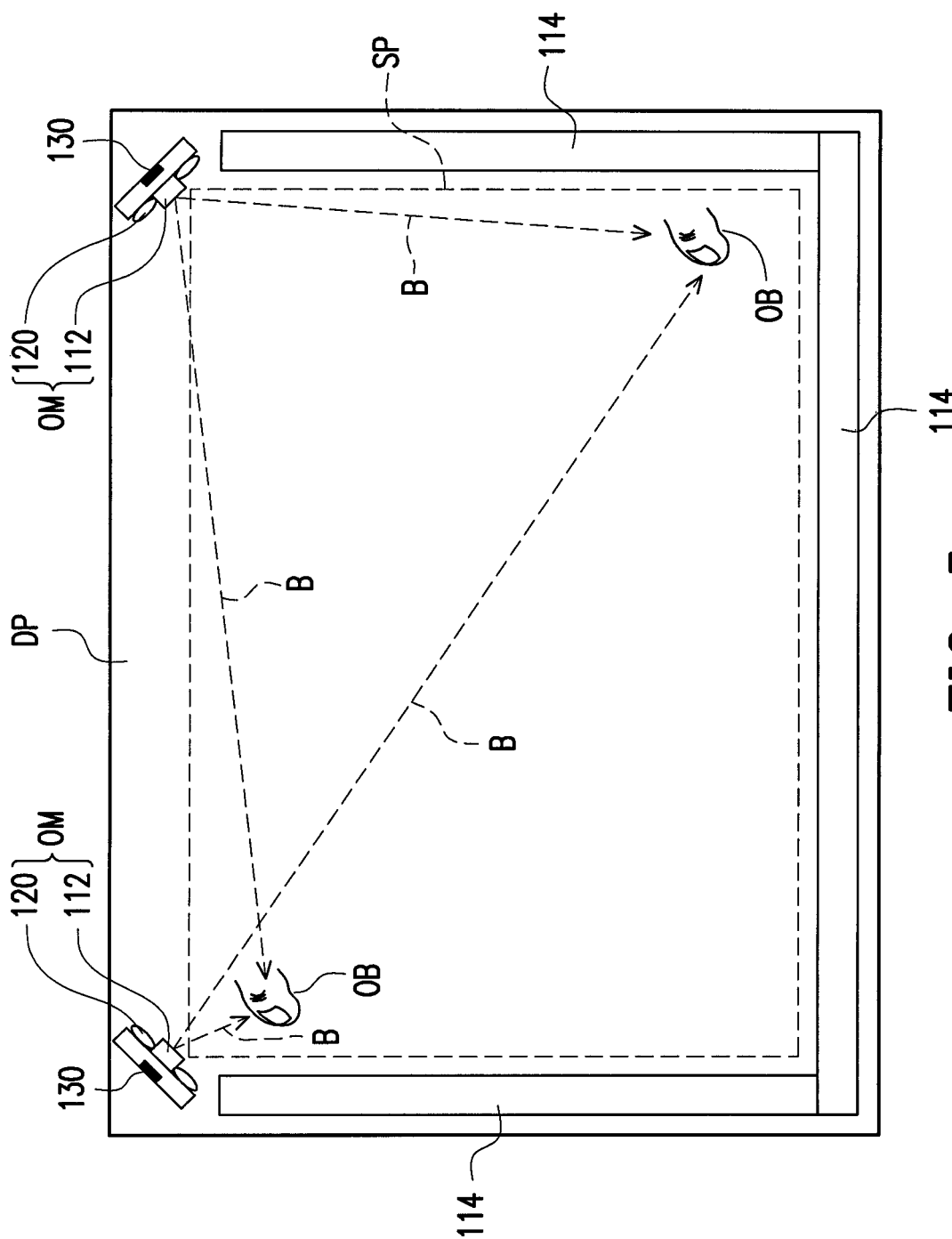
FIG. 3 is a top-view schematic diagram showing an optical touch system according to the embodiment shown in FIG. 1A.

However, the optical touch system 100 can detect whether the object OB currently floats above the base plane SP or touches the base plane SP, and can also correspond to a detection angle of the image detecting module 120 according to a significant drop on a portion of the signal intensity of the detecting signal DS, thereby determining the two-dimensional coordinate of the object on the plane parallel to the base plane SP. FIG. 3 is a top-view schematic diagram showing an optical touch system according to the embodiment shown in FIG. 1A. Referring to FIG. 1A and FIG. 3, in the embodiment, specifically, the at least one light emitting module 112 is a plurality of light emitting modules 112 (such as two light emitting modules in the embodiment), and the at least one image detecting module 120 is a plurality of image detecting modules 120 (such as two image detecting modules in the embodiment). Each of the light emitting modules 112 correspondingly forms an optical modulo OM with one of the image detecting modules 120, and the processing unit 130 can employ a triangulation method for processing the detecting signals DS from the optical modules OM to determine the two-dimensional coordinate of the object OB with respect to the base plane SP. Accordingly, the optical touch system 100 is capable of detecting the action of the object OB along the direction parallel to the base plane SP with respect to the base plane SP within the detection range, and concurrently, is also capable of detecting the object whether touches or floats above the base plane SP.

Figure 4:
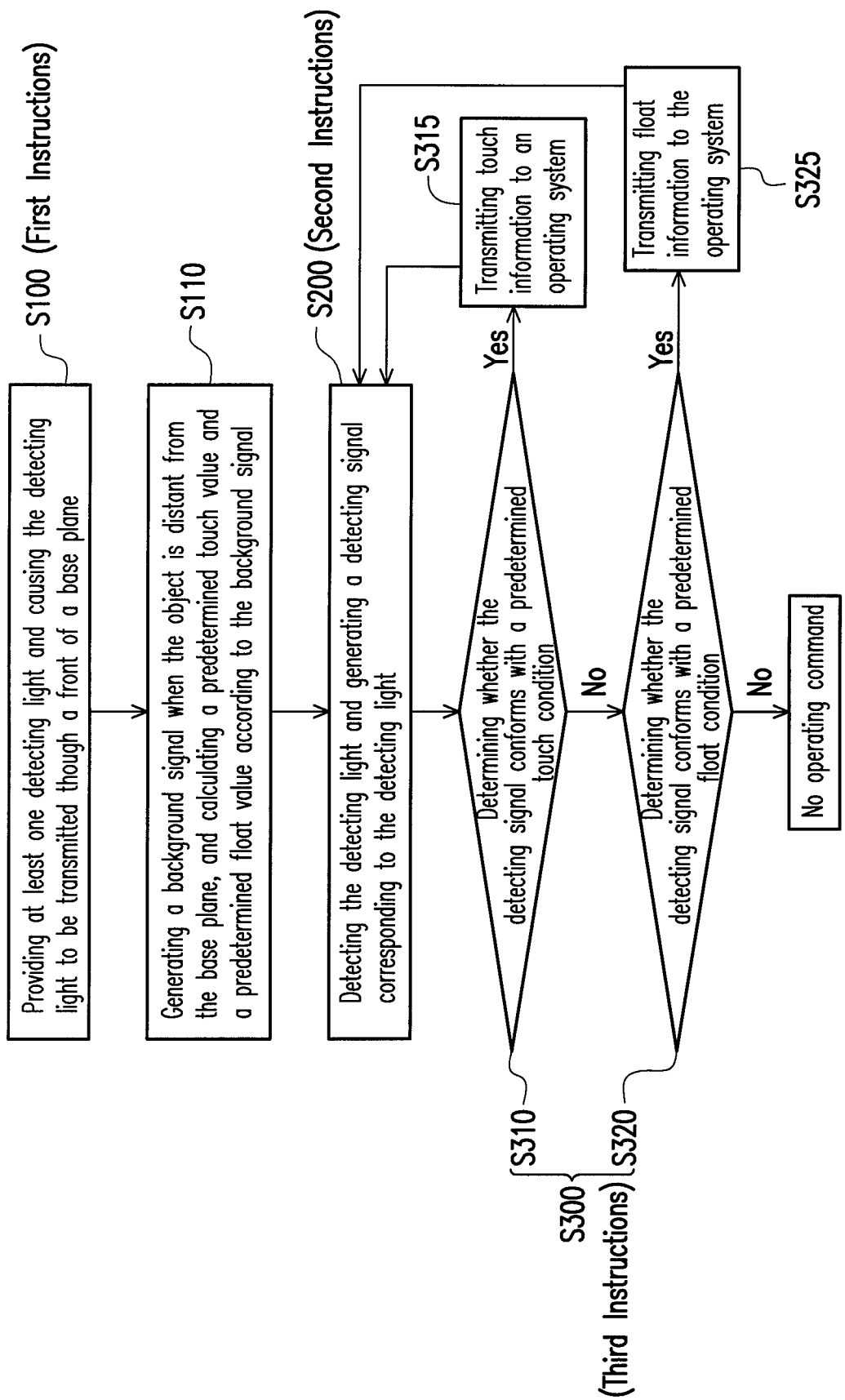
FIG. 4 is a flowchart diagram showing a method of touch detection according to an embodiment of the disclosure.

FIG. 4 is a flowchart diagram showing a method of touch detection according to an embodiment of the disclosure. Referring to FIG. 1A to FIG. 4, in the embodiment, the method of touch detection, for instance, can utilize the optical touch system 100 depicted in FIG. 1A to execute, and the descriptions related to the optical touch system and the object can refer to the afore-described embodiments depicted in FIG. 1A to FIG. 3, and thus the detailed descriptions thereof will be omitted herein. Alternatively, the method of touch detection can also be a computer program product (which includes the instructions configured to execute the method of touch detection), and to be executed together with a hardware such as the optical touch system 100 depicted in the embodiments of FIG. 1A to FIG. 3, although the disclosure is not limited thereto.

In the embodiment, the method of touch detection is configured to determine an action of an object approaching or touching a base plane. The method of touch detection includes the following steps. In step S100 (can also be referred as the first instructions), at least one detecting light B is provided and the detecting light B is caused to be transmitted though a front of the base plane SP. In step 200 (can also be referred as the second instructions), the detecting light B is detected and a detecting signal DS corresponding to the detecting light B is generated, in which when the object OB approaches or touches the base plane SP, the object OB obstructs at least a portion of the detecting light B. In step S300 (can also be referred as the third instructions), a position of the object OB with respect to the base plane SP is determined according to the detecting signal DS, and the object OB approaching or touching the base plane SP is determined according to an intensity of a portion of the detecting signal DS corresponding to the obstruction position of the object OB. Thereby, the fine effects of float and touch detections can be achieved without the need to use a specific object, in which the descriptions related to the optical touch system and the object can refer to the afore-described embodiments depicted in FIG. 1A to FIG. 3, and thus the detailed descriptions thereof will be omitted herein.

Additionally, the method of touch detection described above can also be represented as a computer program product which is stored in a computer readable medium (such as a physical hard disk, a network, a memory, an optical disc or other computer readable mediums) and is configured to determine an action of an object approaching or touching a base plane and to include the instructions for executing the method of touch detection. The computer program product can be executed together with a hardware such as the optical touch system 100 depicted in the embodiments of FIG. 1A to FIG. 3, although the disclosure is not limited thereto.

Specifically, in the embodiment, the step (step S300 as the third instructions) of determining that the object OB approaches or touches the base plane SP according to the intensity of the portion of the detecting signal DS corresponding to an obstruction position of the object OB includes: determining whether the detecting signal DS conforms with a predetermined touch condition, wherein if the detecting signal DS conforms with the predetermined touch condition, the object OB is determined to be touching the base plane SP; and determining whether the detecting signal DS conforms with a predetermined float condition, wherein if the detecting signal DS conforms with the predetermined float condition, the object OB is determined to be approaching and floating above the base plane SP. The detecting light B can be provided by at least one light emitting module 112 disposed beside the base plane SP, and the detecting light B is transmitted to a reflecting unit 114 disposed beside the base plane SP through a front of the base plane SP. The image detecting module 120 detects the detecting light B reflected by the reflecting unit 114 to generate the detecting signal DS. The other devices for executing the afore-described determination process can utilize the devices depicted in the embodiment of FIG. 1A to determine, for instance. The descriptions can refer to the afore-described embodiments depicted in FIG. 1A to FIG. 3, and thus the detailed descriptions thereof will be omitted herein. Alternatively, the afore-described determination process can also be the computer program product including the instructions for executing the method of touch detection, and to be executed together with a hardware such as the optical touch system 100 depicted in the embodiments of FIG. 1A to FIG. 3, although the disclosure is not limited thereto.

More specifically, in the embodiment, step S300 (the third instructions) includes determining whether the detecting signal DS conforms with a predetermined touch condition (step S310), in which if the detecting signal DS conforms with the predetermined touch condition, then the object OB is determined to be touching the base plane SP, thereby transmitting a touch signal to an operating system (such as transmitting to the optical touch system 100 depicted in FIG. 1A) in order to response (such as generating the display frame corresponding to the object OB being touched) (step 315) and continuing to execute step S200 (the second instructions). If the detecting signal DS does not conform with the predetermined touch condition, then step S320 is executed.

On the other hand, step S300 (the third instructions) includes determining whether the detecting signal DS conforms with a predetermined float condition (step S320), in which if the detecting signal DS conforms with a predetermined float condition, then the object OB is determined to be approaching and floating above the base plane SP, thereby transmitting a float signal to the operating system (such as transmitting to the optical touch system 100 depicted in FIG. 1A) in order to response (such as generating the display frame corresponding to the object OB being floated) (step 325), and continuing to execute step S200 (the second instructions). If the detecting signal DS does not either conform with the predetermined float condition or the predetermined touch condition, then no operating instruction is determined. To be specific, the predetermined touch condition is that the signal intensity of the detecting signal DS is lower than a predetermined touch value TD, and the predetermined float condition is that the signal intensity of the detecting signal DS is higher than the predetermined touch value TD and lower than a predetermined float value FD. Therefore, the object OB touching the base plane SP or floating above the base plane SP can be detected precisely. The other devices for executing the afore-described determination process can utilize the devices depicted in the embodiment of FIG. 1A to determine, for instance. The descriptions can refer to the afore-described embodiments depicted in FIG. 1A to FIG. 3, and thus the detailed descriptions thereof will be omitted herein. Alternatively, the afore-described determination process can also be the computer program product including the instructions for executing the method of touch detection, and to be executed together with a hardware such as the optical touch system 100 depicted in the embodiments of FIG. 1A to FIG. 3, although the disclosure is not limited thereto.

To be more specific, in the embodiment, the method of touch detection can further include the following steps. A background BG is generated when the object OB is distant from the base plane SP, and the predetermined touch value TD and the predetermined float value FD are calculated according to the background signal BG, in which the predetermined touch value TD is M times the background signal BG, and the predetermined float value FD is N times the background signal BG, where N>M. More specifically, in the embodiment, the ranges of M and N can be 2/10<M<3/10 and 7/10<N<8/10, for instance.

However, in other embodiments, the predetermined touch value TD and the predetermined float value FD can also be respectively set as default values, or the values of M and N can be set differently according to the actual application requirement, although the disclosure is not limited thereto. The descriptions can refer to the afore-described embodiments depicted in FIG. 1A to FIG. 3, and thus the detailed descriptions thereof will be omitted herein.

Additionally, in the embodiment, the at least one detecting light B is a plurality of detecting lights B, and the method of touch detection can further include: employing the triangulation method for processing the detecting signals DS respectively corresponding to the detecting lights B to determine the two-dimensional coordinate of the object OB with respect to the base plane SP. In other words, other than detecting whether the object OB touches the base plane SP or floats above the base plane SP, the method of touch detection can also detect the two-dimensional coordinate of the object OB along the direction parallel to the base plane SP by providing the plurality of the detecting lights B in various directions (such as providing the detecting lights B with certain opening angles along the two directions depicted in FIG. 1A) without limiting to use a specific touch object (such as the stylus pen etc.), thereby achieving the effects of float and touch detections. The devices for executing the afore-described steps can utilize the optical touch system 100 depicted in FIG. 1A, for instance. The descriptions can refer to the afore-described embodiments depicted in FIG. 1A to FIG. 3, and thus the detailed descriptions thereof will be omitted herein. Alternatively, the afore-described determination process can also be the computer program product including the instructions for executing the method of touch detection, and to be executed together with a hardware such as the optical touch system 100 depicted in the embodiments of FIG. 1A to FIG. 3, although the disclosure is not limited thereto.

Based on the above description, the optical touch system shown in the embodiments of the disclosure can detect whether the object floats above the base plane or touches the base plane through the image detecting module detects whether the portion of the detecting light obstructed by the object conforms with the predetermined conditions. Moreover, the optical touch system can further detect the two-dimensional coordinate of the object along the direction parallel to the base plane under the circumstance of the plurality of image detecting modules being disposed and the plurality of detecting lights being provided. The method of touch detection in the embodiments of the disclosure can detect whether the object floats above the base plane or touches the base plane through detecting whether the portion of the detecting light obstructed by the object conforms with the predetermined conditions. Moreover, the method of touch system can further detect the two-dimensional coordinate of the object along the direction parallel to the base plane under the circumstance of the plurality of detecting lights being provided. Additionally, the computer program product in the embodiments of the disclosure can determine whether the object touches the base plane or floats above the base plane through analyzing whether the signal intensity of the detecting signal corresponding to the portion of the detecting light obstructed by the object conforms with the predetermined conditions.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An optical touch system, configured to determine an action of an object approaching or touching a base plane, the optical touch system comprising:
   a display apparatus, having a display surface;
   a light source module, disposed beside the base plane, and providing a detecting light wherein the detecting light is transmitted in front of the base plane;
   at least one image detecting module, disposed beside the base plane, and detecting an intensity variation of the detecting light, wherein the image detecting module generates a detecting signal corresponding to the detecting light, and at least a portion of the detecting light is obstructed by the object when the object approaches or touches the base plane; and
   a processing unit, determining a position of the object with respect to the base plane according to the detecting signal, and determining that the object approaches or touches the base plane according to an intensity of a portion of the detecting signal corresponding to an obstruction position of the object,
   wherein if the detecting signal conforms with a predetermined touch condition, then the processing unit determines that the object is touching the base plane, and if the detecting signal does not conforms with the predetermined touch condition, then the processing unit determines whether the detecting signal conforms with a predetermined float condition, wherein if the detecting signal conforms with the predetermined float condition, then the processing unit determines that the object is approaching and floating above the base plane, and the processing unit transmits a signal to the display apparatus to a generate highlight state or a dotted frame for a selected region corresponding to position of the object with respect to the display surface, and if the detecting signal does not conforms with the predetermined float condition, then no operation is determined to be performed by the processing unit.

2. The optical touch system as claimed in claim 1, wherein the light source module comprises:
a reflecting unit, disposed beside the base plane; and
at least one light emitting module, disposed beside the base plane, wherein the detecting light emitted from the light emitting module is transmitted to the reflecting unit through a front of the base plane, and the image detecting module detects the detecting light reflected by the reflecting unit to generate the detecting signal.

3. The optical touch system as claimed in claim 2, wherein the at least one light emitting module is a plurality of light emitting modules, the at least one image detecting module is a plurality of image detecting modules, each of the light emitting modules correspondingly forms an optical module with one of the image detecting modules, the processing unit employs a triangulation method for processing the detecting signals from the optical modules to determine a two-dimensional coordinate of the object with respect to the base plane.

4. The optical touch system as claimed in claim 1, wherein the predetermined touch condition is that a signal intensity of the detecting signal is lower than a predetermined touch value, and the predetermined float condition is that a signal intensity of the detecting signal is higher than the predetermined touch value and lower than a predetermined float value.

5. The optical touch system as claimed in claim 4, wherein when the object is distant from the base plane, the image detecting module generates a background signal corresponding to the detecting light and the processing unit calculates the predetermined touch value and the predetermined float value according to the background signal.

6. The optical touch system as claimed in claim 5, wherein the predetermined touch value is M times the background signal, and the predetermined float value is N times the background signal, where N>M.

7. The optical touch system as claimed in claim 6, wherein: 2/10<M<3/10, and 7/10<N<8/10.

8. The optical touch system as claimed in claim 1, wherein the at least one image detecting module is a plurality of image detecting modules, and the optical touch system determines a two-dimensional coordinate of the object with respect to the base plane via a triangulation method according to each of the detecting signals respectively detected by each of the image detecting modules.

9. The optical touch system as claimed in claim 1, wherein the display surface is the base plane.

10. A method of touch detection, configured to determine an action of an object approaching or touching a base plane, the method of touch detection comprising:
providing a display apparatus, having a display surface and a processing unit;
providing at least one detecting light and causing the detecting light to be transmitted though a front of the base plane;
detecting the detecting light and generating a detecting signal corresponding to the detecting light, wherein when the object is approaching or touching the base plane, at least a portion of the detecting light is obstructed by the object;
determining a position of the object with respect to the base plane according to the detecting signal, and determining that the object approaches or touches the base plane according to an intensity of a portion of the detecting signal corresponding to an obstruction position of the object; and
determining whether the detecting signal conforms with a predetermined touch condition, wherein if the detecting signal conforms with the predetermined touch condition, then the object is determined to be touching the base plane, and if the detecting signal does not conforms with the predetermined touch condition, then determining whether the detecting signal conforms with a predetermined float condition, wherein if the detecting signal conforms with the predetermined float condition, then the object is determined to be approaching and floating above the base plane, and the processing unit transmits a signal to the display apparatus to generate a highlight state or a dotted frame for a selected region corresponding to position of the object with respect to the display surface, and if the detecting signal does not conforms with the predetermined float condition, then no operation is determined.

11. The method of touch detection as claimed in claim 10, wherein the detecting light is provided by at least one light emitting module disposed beside the base plane, the detecting light is transmitted to a reflecting unit disposed beside the base plane through the front of the base plane, and the detecting light reflected by the reflecting unit is detected to generate the detecting signal.

12. The method of touch detection as claimed in claim 10, wherein the predetermined touch condition is that a signal intensity of the detecting signal is lower than a predetermined touch value, and the predetermined float condition is that a signal intensity of the detecting signal is higher than the predetermined touch value and lower than a predetermined float value.

13. The method of touch detection as claimed in claim 12, further comprising:
generating a background signal when the object is distant from the base plane, and calculating the predetermined touch value and the predetermined float value according to the background signal.

14. The method of touch detection as claimed in claim 13, wherein the predetermined touch value is M times the background signal, and the predetermined float value is N times the background signal, where N>M.

15. The method of touch detection as claimed in claim 14, wherein: 2/10<M<3/10, and 7/10<N<8/10.

16. The method of touch detection as claimed in claim 10, wherein the at least one detecting light is a plurality of detecting lights, and the method of touch detection further comprises:
employing a triangulation method for processing the detecting signals respectively corresponding to the detecting lights to determine a two-dimensional coordinate of the object with respect to the base plane.

17. The method of touch detection as claimed in claim 10, wherein the base plane is the display surface.

18. A non-transitory computer readable medium recording program instructions for determining an action of an object approaching or touching a base plane, the non-transitory computer readable medium recording program instructions comprising:

first instructions for providing at least one detecting light and causing the detecting light to be transmitted though a front of the base plane;

second instructions for detecting the detecting light and generating a detecting signal corresponding to the detecting light, wherein when the object approaches or touches the base plane, at least a portion of the detecting light is obstructed by the object; and third instructions for determining a position of the object with respect to the base plane according to the detecting signal, and determining that the object approaches or touches the base plane according to an intensity of a portion of the detecting signal corresponding to an obstruction position of the object, wherein the third instructions comprise:

instructions for determining whether the detecting signal conforms with a predetermined touch condition, wherein the object is determined to be touching the base plane when the detecting signal conforms with the predetermined touch condition; and instructions for determining whether the detecting signal conforms with a predetermined float condition when the detecting signal does not conforms with the predetermined touch condition, wherein if the detecting signal conforms with the predetermined float condition, then the object is determined to be approaching and floating above the base plane, and a signal is transmitted to a display apparatus to generate a highlight state or a dotted frame for a selected region corresponding to position of the object with respect to a display surface of the display apparatus, and if the detecting signal does not conforms with the predetermined float condition, then no operation is determined.

19. The non-transitory computer readable medium recording program instructions as claimed in claim 18, wherein the predetermined touch condition is that a signal intensity of the detecting signal is lower than a predetermined touch value, and the predetermined float condition is that a signal intensity of the detecting signal is higher than the predetermined touch value and lower than a predetermined float value.

20. The non-transitory computer readable medium recording program instructions as claimed in claim 19, further comprising:

instructions for generating a background signal when the object is distant from the base plane and calculating the predetermined touch value and the predetermined float value according to the background signal.

21. The non-transitory computer readable medium recording program instructions as claimed in claim 10, wherein the predetermined touch value is M times the background signal, and the predetermined float value is N times the background signal, where N>M.

22. The non-transitory computer readable medium recording program instructions as claimed in claim 21, wherein: $2/10<M<3/10$, and $7/10<N<8/10$.

23. The non-transitory computer readable medium recording program instructions as claimed in claim 18, wherein the at least one detecting light is a plurality of detecting lights, and the computer program product further comprises:

instructions for employing a triangulation method for processing the detecting signals respectively corresponding to the detecting lights to determine a two-dimensional coordinate of the object with respect to the base plane.

24. The non-transitory computer readable medium recording program instructions as claimed in claim 18, wherein the base plane is the display surface.

* * * * *